United States Patent
Jung et al.

(10) Patent No.: US 10,645,609 B2
(45) Date of Patent: May 5, 2020

(54) METHOD AND APPARATUS FOR TRANSMITTING TCP ACK IN COMMUNICATION SYSTEM

(71) Applicant: Samsung Electronics Co., Ltd., Suwon-si, Gyeonggi-do (KR)

(72) Inventors: Hakyung Jung, Suwon-si (KR); Jinhyoung Kim, Seongnam-si (KR); Sangkyu Baek, Yongin-si (KR); Giwon Lee, Seoul (KR); Jinho Lee, Seoul (KR); Hyunjoo Lee, Seoul (KR); Sooyoung Jang, Suwon-si (KR); Jaehyun Hwang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/009,872

(22) Filed: Jun. 15, 2018

(65) Prior Publication Data
US 2018/0368021 A1 Dec. 20, 2018

(30) Foreign Application Priority Data
Jun. 16, 2017 (KR) .......................... 10-2017-0076737

(51) Int. Cl.
*H04W 28/02* (2009.01)
*H04L 12/855* (2013.01)
(Continued)

(52) U.S. Cl.
CPC .......... *H04W 28/0273* (2013.01); *H04L 47/20* (2013.01); *H04L 47/2466* (2013.01);
(Continued)

(58) Field of Classification Search
CPC .......... H04W 28/0273; H04W 28/0289; H04L 47/11; H04L 47/12; H04L 47/193;
(Continued)

(56) References Cited

U.S. PATENT DOCUMENTS

| 5,793,768 A | * | 8/1998 | Keshav | .................. H04L 47/10 370/241 |
| 6,038,606 A | * | 3/2000 | Brooks | .................. H04L 1/1854 370/229 |

(Continued)

FOREIGN PATENT DOCUMENTS

| AU | 6610401 A | * | 1/2002 | ........... H04L 1/1635 |
| CN | 105264843 A | * | 1/2016 | ......... H04L 12/6418 |

(Continued)

OTHER PUBLICATIONS

Floyd et al., Adding Acknowledgement Congestion Control to TCP, Dec. 2007, IETF, draft-floyd-tcpm-ackcc-02.txt, <https://www.ietf.org/proceedings/70/slides/tcpm-3.pdf, accessed Jul. 6, 2019> (Year: 2019).*

(Continued)

*Primary Examiner* — Eric Nowlin
(74) *Attorney, Agent, or Firm* — Jefferson IP Law, LLP

(57) ABSTRACT

The present disclosure relates to a communication method and a system for converging a 5th-generation (5G) communication system for supporting higher data rates beyond a 4th-generation (4G) system with a technology for internet of things (IoT). The disclosure may be applied to intelligent services based on the 5G communication technology and the IoT-related technology, such as smart home, smart building, smart city, smart car, connected car, health care, digital education, smart retail, security and safety services. A method of a communication apparatus includes determining an acknowledgement (ACK) transmission frequency for each flow, based on a state of a transmission control protocol (TCP) transmitter, identifying whether uplink resources are insufficient, selecting a flow for adjustment of the ACK transmission frequency when the uplink resources are insuf- (Continued)

ficient, and adjusting the ACK transmission frequency of the selected flow.

14 Claims, 14 Drawing Sheets

(51) Int. Cl.
   *H04L 12/813* (2013.01)
   *H04L 12/841* (2013.01)
   *H04L 12/823* (2013.01)
(52) U.S. Cl.
   CPC .......... *H04L 47/283* (2013.01); *H04L 47/323* (2013.01); *H04W 28/0236* (2013.01)
(58) Field of Classification Search
   CPC ... H04L 47/2466; H04L 47/27; H04L 47/283; H04L 47/323; H04L 47/38
   See application file for complete search history.

(56) References Cited

U.S. PATENT DOCUMENTS

| | | | |
|---|---|---|---|
| 6,622,172 B1 | 9/2003 | Tam | |
| 6,961,309 B2 | 11/2005 | Carlson et al. | |
| 7,225,266 B2 * | 5/2007 | Ameigeiras | H04L 1/1854 370/237 |
| 7,898,946 B2 * | 3/2011 | Lee | H04L 47/12 370/230 |
| 8,661,322 B2 * | 2/2014 | Julian | H04L 1/1819 714/774 |
| 9,253,104 B2 * | 2/2016 | Jin | H04L 12/56 |
| 9,351,183 B2 * | 5/2016 | Bellamkonda | H04L 47/11 |
| 9,386,128 B2 | 7/2016 | Ehsan et al. | |
| 9,444,749 B2 * | 9/2016 | Cociglio | H04L 47/2475 |
| 9,553,814 B2 * | 1/2017 | Lee | H04L 1/16 |
| 10,021,688 B2 * | 7/2018 | Xie | H04L 12/6418 |
| 10,278,227 B2 * | 4/2019 | Wang | H04W 76/15 |
| 10,432,349 B2 * | 10/2019 | Wilhelmsson | H04L 1/1887 |
| 10,440,604 B2 * | 10/2019 | Zhang | H04L 69/16 |
| 10,447,439 B2 * | 10/2019 | Meyer | H04L 1/1854 |
| 2002/0159396 A1 * | 10/2002 | Carlson | H04L 1/1848 370/252 |
| 2004/0109477 A1 * | 6/2004 | Lee | H04L 47/12 370/535 |
| 2004/0122969 A1 * | 6/2004 | Ameigeiras | H04L 1/1854 709/235 |
| 2005/0243762 A1 * | 11/2005 | Terry | H04W 28/18 370/328 |
| 2005/0265371 A1 * | 12/2005 | Sharma | H04L 1/0083 370/428 |
| 2006/0136790 A1 * | 6/2006 | Julian | H04L 1/1819 714/704 |
| 2010/0067467 A1 * | 3/2010 | Cho | H04W 74/004 370/329 |
| 2012/0076113 A1 * | 3/2012 | Proctor, Jr. | H04W 72/0446 370/335 |
| 2014/0226473 A1 * | 8/2014 | Jin | H04L 12/56 370/230 |
| 2014/0226571 A1 * | 8/2014 | Das | H04L 41/0896 370/329 |
| 2014/0241164 A1 * | 8/2014 | Cociglio | H04L 47/2475 370/235 |
| 2014/0242916 A1 * | 8/2014 | Bellamkonda | H04L 47/11 455/67.11 |
| 2015/0006625 A1 * | 1/2015 | Lee | H04L 1/16 709/203 |
| 2016/0302197 A1 * | 10/2016 | Xie | H04L 12/6418 |
| 2017/0019803 A1 | 1/2017 | Nguyen et al. | |
| 2017/0126574 A1 * | 5/2017 | Goel | H04L 43/0882 |
| 2018/0092115 A1 * | 3/2018 | Krasnyanskiy | H04L 5/0055 |
| 2018/0367284 A1 * | 12/2018 | Huang | H04L 5/0051 |
| 2018/0368021 A1 * | 12/2018 | Jung | H04W 28/0273 |
| 2019/0045388 A1 * | 2/2019 | Zhang | H04W 28/0231 |
| 2019/0075604 A1 * | 3/2019 | Wang | H04W 76/15 |
| 2019/0246432 A1 * | 8/2019 | Hosseini | H04L 1/1671 |
| 2019/0254021 A1 * | 8/2019 | Hosseini | H04L 5/0053 |
| 2019/0297020 A1 * | 9/2019 | Mudireddy | H04L 69/163 |

FOREIGN PATENT DOCUMENTS

| | | | | |
|---|---|---|---|---|
| CN | 102790913 B | * | 11/2016 | |
| DE | 112013007142 T5 | * | 4/2016 | ......... H04L 12/6418 |
| EP | 1290838 A1 | * | 3/2003 | ........... H04L 1/1635 |
| EP | 2772028 A1 | * | 9/2014 | ........ H04L 47/2475 |
| JP | 5387058 B2 | * | 1/2014 | |
| KR | 10-2013-0074828 A | | 7/2013 | |
| KR | 20180137281 A | * | 12/2018 | ........ H04W 28/0273 |
| WO | WO-2013060378 A1 | * | 5/2013 | ......... H04L 47/2475 |
| WO | WO-2013094964 A1 | * | 6/2013 | .............. H04L 1/16 |
| WO | WO-2014194515 A1 | * | 12/2014 | ......... H04L 12/6418 |
| WO | WO-2016112695 A1 | * | 7/2016 | .............. H04L 1/16 |
| WO | WO-2018231416 A1 | * | 12/2018 | ........... H04L 1/1664 |

OTHER PUBLICATIONS

Floyd et al., RFC 2883: An Extension to the Selective Acknowledgement (SACK) Option for TCP, Jul. 2000, IETF, Network Working Group (Year: 2000).*

Landstrom et al., Reducing the TCP Acknowledgment Frequency, Jul. 2007, ACM, ACM SIGCOMM Computer Communication Review, vol. 37, No. 3 (Year: 2007).*

Oo et al., How Good Delayed Acknowledgement effects Rate-Based Pacing TCP over Multi-hop Wireless Network, May 17, 2009, 2009 International Conference on Signal Processing Systems, IEEE Computer Society, pp. 464-468 (Year: 2009).*

Wang et al., Analysis of Optimal ACK Frequency over Asymmetric GEO-Space Channels, 2004, IEEE Communications Society, Globecom 2004, pp. 2717-2721 (Year: 2004).*

Wang et al., Configurable Acknowledgment Delay (CAD) Mechanism for Asymmetric Space-Internet Links, 2006, IEEE, IEEE GLOBECOM 2006 (Year: 2006).*

Braden, RFC 1122: Requirements for Internet Hosts—Communication Layers, Oct. 1989, IETF, pp. 95-97 (Year: 1989).*

* cited by examiner

METHOD AND APPARATUS FOR TRANSMITTING TCP ACK IN COMMUNICATION SYSTEM

CROSS-REFERENCE TO RELATED APPLICATION(S)

This application is based on and claims priority under 35 U.S.C. § 119 of a Korean patent application number 10-2017-0076737, filed on Jun. 16, 2017, in the Korean Intellectual Property Office, the disclosure of which is incorporated by reference herein in its entirety.

BACKGROUND

1. Field

The disclosure relates to a communication system. More particularly, the disclosure relates to a communication method and apparatus of the communication system using a transmission control protocol (TCP).

2. Description of Related Art

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMPs), reception-end interference cancellation and the like. In the 5G system, hybrid frequency-shift keying (FSK), quadrature amplitude modulation (QAM), and frequency and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology. Meanwhile, a delayed acknowledgment (ACK) technique of a transmission control protocol (TCP) protocol is used in most TCP implementations including the Linux operating system. The delayed ACK technique is defined as an operation of reducing a plurality of ACK responses to a single ACK response, and aims at reducing the overhead of the TCP protocol. According to the delayed ACK technique, when one TCP data is received, a TCP ACK response is delayed. Then, if no further TCP data is received during a specific time of if another TCP data is received before the specific time elapses, the TCP ACK response is transmitted.

Generally, in many applications using TCP, several TCP data are continuously transmitted rather than a single TCP data is transmitted. Therefore, one TCP ACK is transmitted after usually two TCP data are received.

However, in a high-speed network environment of tens of Gbps including the 5G mobile communication, such a typical implementation of TCP delayed ACK consumes a bandwidth of hundreds of Mbps only for a TCP ACK response and thus does not seem to sufficiently reduce the protocol overhead.

Accordingly, there is a need for a method of reducing the overhead of the TCP protocol while maintaining the performance of the TCP protocol.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a technique to enhance resource utilization efficiency of a communication operator without deterioration of a user's sensory performance by enabling in an end-point receiving apparatus or intermediate transit apparatus of a transmission control protocol (TCP) protocol to transmit variably delayed or compressed TCP acknowledgment (ACK).

Additional aspects will be set forth in part in the description which follows and, in part, will be apparent from the description, or may be learned by practice of the presented embodiments.

In accordance with an aspect of the disclosure, a method of a communication apparatus is provided. The method includes determining an acknowledgement (ACK) transmission frequency for each flow, based on a state of a transmission control protocol (TCP) transmitter, identifying whether uplink resources are insufficient, selecting a flow for adjustment of the ACK transmission frequency when the uplink resources are insufficient, and adjusting the ACK transmission frequency of the selected flow.

In accordance with another aspect of the disclosure, a communication apparatus is provided. The communication apparatus includes a transceiver configured to transmit and receive signals, and at least one processor configured to determine an acknowledgement (ACK) transmission frequency for each flow, based on a state of a transmission control protocol (TCP) transmitter, to identify whether uplink resources are insufficient, to select a flow for adjustment of the ACK transmission frequency when the uplink resources are insufficient, and to adjust the ACK transmission frequency of the selected flow.

According to one embodiment of the disclosure, an end-point receiving apparatus or intermediate transit apparatus distinguishes a case of requiring a fast TCP response from the other cases, depending on a TCP state of a counterpart transmitting apparatus, and then variably applies a delay or compression of TCP ACK. It is therefore possible to enhance resource utilization efficiency without deterioration of a user's sensory performance.

According to another embodiment of the disclosure, the end-point receiving apparatus or intermediate transit apparatus selects and variably applies, based on priorities of TCP flows, a flow for which a TCP ACK response will be delayed or compressed.

According to still another embodiment of the disclosure, the end-point receiving apparatus or intermediate transit apparatus recognizes a situation in which UL resources are still insufficient even though the TCK ACK response is delayed or compressed, and then delays the transmission of uplink TCP data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
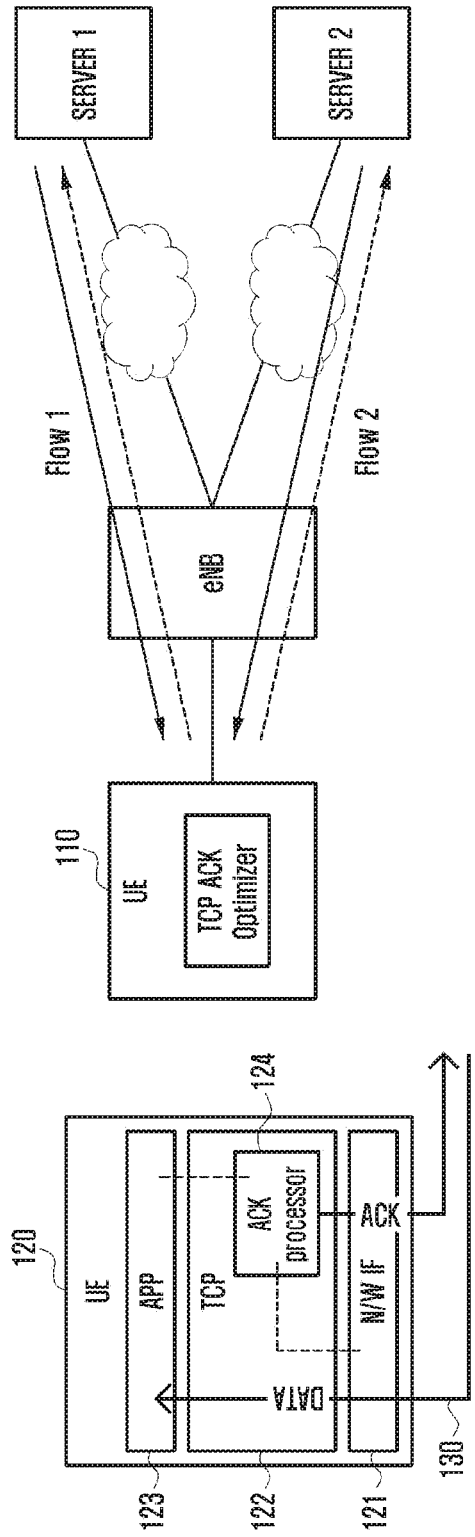
FIG. 1 is a diagram illustrating a relationship among a communication apparatus and other apparatuses according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and the manner of achieving them will become apparent with reference to the various embodiments described in detail below and with reference to the accompanying drawings. The disclosure may, however, be embodied in many different forms and should not be construed as being limited to the various embodiments set forth herein. Rather, these embodiments are provided so that this disclosure will be thorough and complete and will fully convey the scope of the disclosure to those skilled in the art. To fully disclose the scope of the disclosure to those skilled in the art, the disclosure is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

Additionally, in the drawings illustrating methods of various embodiments, the order of description does not necessarily correspond to the order of execution. The described operations may be executed in a reversed order or executed in parallel.

In addition, the disclosure will be described by way of example of a wireless communication system for convenience of explanation, but the disclosure may also be applied to a wired communication system.

As described above, in a high-speed network environment including the next generation mobile communication (e.g., 5th-generation (5G) mobile communication), a bandwidth of several hundreds of Mbps is consumed only for a transmission control protocol (TCP) response, so that the TCP protocol overhead cannot be sufficiently reduced. For example, in case of the 5G mobile communication in which a downlink (DL) peak rate is 20 Gbps, if the size of TCP data is 1500 bytes, an uplink (UL) data rate used for TCP acknowledgment (ACK) transmission is 347 Mbps for IPv4 and 480 Mbps for IPv6 as shown in Table 1 below.

TABLE 1

| DL peak rate | Required UL data rate | |
|---|---|---|
| | IPv4 | IPv6 |
| 5 Gbps | 86.7 Mbps | 120 Mbps |
| 20 Gbps | 346.7 Mbps | 480 Mbps |

One approach to implement TCP delayed ACK is to transmit TCP ACK when N (which is a natural number greater than 2) TCP data are received, rather than when two TCP data are received. However, this approach results in an increased response time of TCP ACK, thus causing an increase in the overall end-to-end round trip time (RTT). Further, the increase of the RTT degrades the throughput performance of the TCP protocol.

Accordingly, proposed hereinafter is a method for increasing the resource utilization efficiency while maintaining the TCP protocol performance by variably delaying or compressing the TCP ACK to be transmitted.

FIG. 1 is a diagram illustrating a relationship among a communication apparatus and other apparatuses according to an embodiment of the disclosure.

The communication apparatus shown in FIG. 1 is an end-point receiving apparatus which is located at one end of a TCP connection. In this embodiment, the end-point apparatus may be a terminal 110 also referred to as user equipment (UE) or the like. In various embodiments of the disclosure, the communication apparatus may include an end-point receiving apparatus, an intermediate transit apparatus, an intermediate apparatus, or the like.

The communication apparatus is connected to a mobile communication base station also referred to as evolved node B (eNB). The communication apparatus may generate a TCP connection with a server outside a mobile communication network through the base station to transmit/receive TCP data and TCP ACK. Also, the communication apparatus may generate a plurality of TCP connections with a plurality of such servers to transmit/receive TCP data and TCP ACK. The communication apparatus may include a TCP ACK optimizer capable of variably performing an ACK delay. Details will be described later.

As shown in FIG. 1, protocol layers 120 of the communication apparatus may be composed of a network interface (N/W IF) 121, a TCP layer 122, and an application layer 123. Other layers irrelative to the disclosure are not shown.

The N/W IF 121 corresponds to a cellular modem in case of the mobile communication network and performs functions of layers 1 and 2 in OSI 7 layers. Data 130 received from the server by the N/W IF 121 is delivered to the application layer 123 via the TCP layer 122 as in case of typical devices. The TCP layer 122 may respond to the server by generating TCP ACK that contains an acknowledgment number indicating a sequence number expected to be received next, based on a sequence number of currently received TCP data and a sequence number of previously received TCP data. At this time, a functional module for generating and transmitting such TCP ACK in the TCP layer may be referred to as an ACK processor 124. In this case, the ACK processor may indicate the above-mentioned TCP optimizer.

The ACK processor 124 of the disclosure may infer a state of a transmitting end of each TCP connection (i.e., a TCP state) and variably perform a suitable ACK delay, thereby saving uplink resources and minimizing the degradation of TCP performance. The apparatus of the disclosure enables the N/W IF to deliver information about uplink resources to the ACK processor of the TCP layer through an internal interface between the N/W IF and the TCP layer. This information about uplink resources may include at least one of the size of the most recently allocated uplink resource, the average size of recently allocated uplink resources, or the size of an uplink resource predicted to be allocated through the average size of recently allocated uplink resources.

In addition, the information about uplink resources may indicate whether current uplink resources are insufficient, or whether predicted uplink resources are insufficient. Also, the information about uplink resources may indicate the size of an uplink data rate to be reduced in the TCP layer.

The ACK processor 124 of the disclosure may utilize the information recognized from the N/W IF for determining the degree of an ACK delay and the like.

In addition, the apparatus of the disclosure enables the application layer to deliver its context to the TCP layer through an internal interface between the application layer and the TCP layer. The application layer includes not only an application program, such as a video streaming player, directly faced by the user, but also a software region, such as an Android framework, not directly faced by the user. The context may include, for example, whether video playback is in an initial state, whether an application runs currently in foreground or background, and the like.

Figure 2:
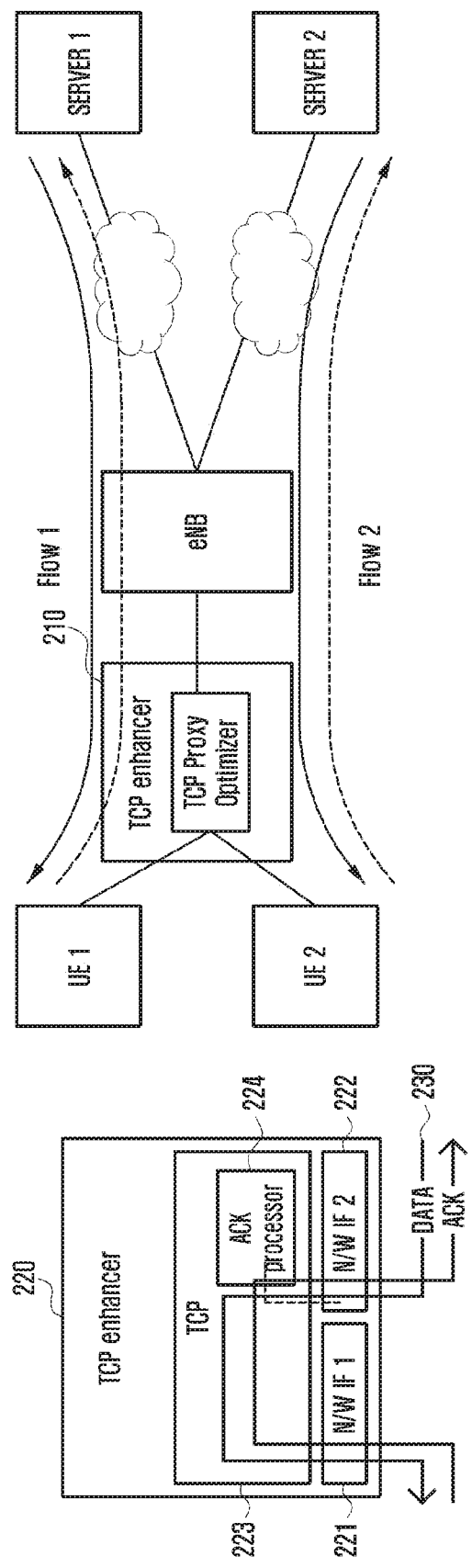
FIG. 2 is a diagram illustrating a relationship among a communication apparatus and other apparatuses according to an embodiment of the disclosure.

FIG. 2 is a diagram illustrating a relationship among a communication apparatus and other apparatuses according to an embodiment of the disclosure.

An intermediate transit apparatus 210 shown in FIG. 2 is located between a terminal (UE) and a server which are both ends of a TCP connection. The intermediate transit apparatus 210 is capable of knowing a state of uplink resources by being directly connected to a base station (eNB) or, even though not directly connected to the base station, through communication with another apparatus directly connected to the base station. As described above, the intermediate transit apparatus may be referred to as a communication apparatus.

The communication apparatus may grasp the contents of the TCP connection between the terminal and the server through a deep packet inspection (DPI) or the like. In addition, the communication apparatus may generate a plurality of TCP connections with a plurality of servers to exchange TCP data and TCP ACK. In this case, the communication apparatus may include a TCP ACK optimizer, which may variably perform ACK compression.

Specifically, while maintaining connections with the terminal and the server, the communication apparatus may deliver TCP data, received from the server, to the terminal, and also deliver TCP ACK generated by the terminal to the server. In this process, the communication apparatus may variably perform an ACK delay by compressing the TCP ACK and transmitting the compressed TCP ACK to the server. Compressing the TCP ACK may mean transmitting only one of TCP ACK responses to the server.

In the disclosure, an operation in which an ACK processor of the communication apparatus generates TCP ACK and performs delay transmission may be expressed as an operation of performing a TCP ACK delay. Also, an operation in which the ACK processor of the communication apparatus transmits only part of received TCP ACKs may be expressed as an operation of compressing TCP ACK. In addition, all the above two operations may be expressed as an operation of compressing TCP ACK, delaying TCP ACK, or adjusting the transmission frequency of TCP ACK.

As shown in FIG. 2, protocol layers 220 of the communication apparatus may be composed of a plurality of network interfaces (N/W IFs) 221 and 222, and a TCP layer 223. Other layers irrelative to the disclosure are not shown. Also, the term TCP enhancer is used exemplarily to indicate an apparatus that is located between the base station and the terminal and transmits/receives flows between the base station and the terminal without dividing the flows. This term may be changed.

For example, one of the N/W IFs, i.e., N/W IF1 221, may correspond to an Ethernet card, and another N/W IF, i.e., N/W IF2 222, may correspond to a cellular modem in the mobile communication network and perform the functions of layers 1 and 2 in the OSI 7 layers. Data 230 received from the server to the N/W IF2 222 may be delivered to the N/W IF1 221 via the TCP layer (or only through the L2 or L3 layer below the TCP layer). After receiving such TCP data, the terminal may respond to the server by generating TCP ACK according to its own logic. This TCP ACK may be delivered to the N/W IF1 221, uploaded to the TCP layer 223, and variably compressed at an ACK processor 224. This compression process refers to leaving only one of TCP ACK responses received through the N/W IF1 221 and removing (or dropping) the rest, and then sending the only one TCP ACK response to the N/W IF2 222. In this case, the ACK processor 224 may mean the above-described TCP optimizer.

The intermediate transit apparatus of the disclosure enables the N/W IF to deliver information about uplink resources to the ACK processor 224 of the TCP layer through an internal interface between the N/W IF and the TCP layer. This information about uplink resources may include at least one of the size of the most recently allocated uplink resource, the average size of recently allocated uplink resources, or the size of an uplink resource predicted to be allocated through the average size of recently allocated uplink resources. In addition, the information about uplink resources may indicate whether current uplink resources are insufficient, or whether predicted uplink resources are insufficient. Also, the information about uplink resources may indicate the size of an uplink data rate to be reduced in the TCP layer. The ACK processor of the disclosure may utilize the information recognized from the N/W IF for determining the degree of an ACK delay and the like.

Figure 3:
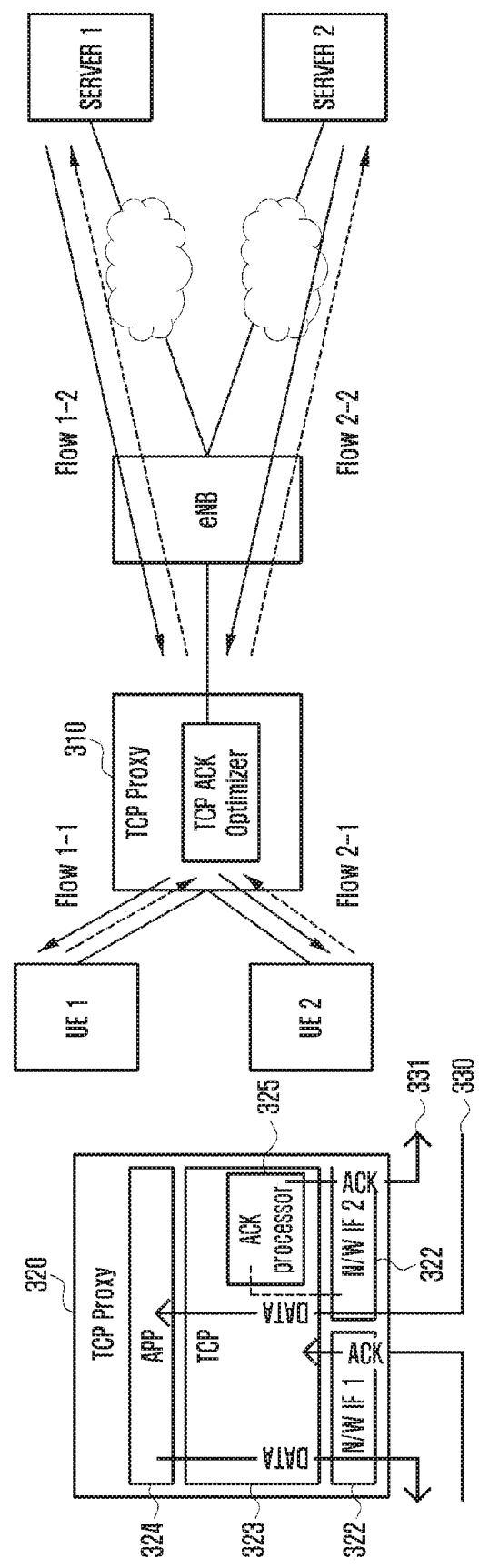
FIG. 3 is a diagram illustrating a relationship among a communication apparatus and other apparatuses according to an embodiment of the disclosure.

FIG. 3 is a diagram illustrating a relationship among a communication apparatus and other apparatuses according to an embodiment of the disclosure.

An intermediate apparatus 310 shown in FIG. 3 is located between a terminal (UE) and a server which are both ends of a TCP connection. The intermediate apparatus 310 is characterized in that one TCP connection between the terminal and the server is divided into two TCP connections between the terminal and the intermediate apparatus and between the intermediate apparatus and the server. In this disclosure, the intermediate apparatus may be referred to as a TCP proxy or a communication apparatus.

The communication apparatus of the disclosure is capable of knowing a state of uplink resources by being directly connected to a base station (eNB) or, even though not directly connected to the base station, through communication with another apparatus directly connected to the base station. The communication apparatus may generate a plurality of TCP connections with the servers to transmit/receive TCP data and TCP ACK. In this case, the communication apparatus may include a TCP ACK optimizer, which may variably perform an ACK delay.

As shown in FIG. 3, protocol layers 320 of the communication apparatus may be composed of a plurality of network interfaces (N/W IFs) 321 and 322, a TCP layer 323, and an application layer 324. Other layers irrelative to the disclosure are not shown.

For example, one of the N/W IFs, i.e., N/W IF1 321, may correspond to an Ethernet card, and another N/W IF, i.e., N/W IF2 322, may correspond to a cellular modem in the mobile communication network and perform the functions of layers 1 and 2 in the OSI 7 layers. Data 330 received from the server to the N/W IF2 322 is delivered to the application layer 324 via the TCP layer 323, and an ACK processor 325 of the TCP layer 323 generates TCP ACK 331 and responds to the server through the N/W IF2 322. At this time, the ACK processor 325 may variably perform a suitable ACK delay by inferring a state of a transmitting end of each TCP connection (i.e., a TCP state) or according to the number of packets being buffered (or queued) for each TCP connection in the intermediate apparatus, thereby saving uplink resources and minimizing the degradation of TCP performance. In this case, the ACK processor may mean the above-described TCP optimizer.

The intermediate apparatus of the disclosure enables the N/W IF to deliver information about uplink resources to the ACK processor of the TCP layer through an internal interface between the N/W IF and the TCP layer. This information about uplink resources may include at least one of the size of the most recently allocated uplink resource, the average size of recently allocated uplink resources, or the size of an uplink resource predicted to be allocated through the average size of recently allocated uplink resources. In addition, the information about uplink resources may indicate whether current uplink resources are insufficient, or whether predicted uplink resources are insufficient. Also, the information about uplink resources may indicate the size of an uplink data rate to be reduced in the TCP layer. The ACK processor of the disclosure may utilize the information recognized from the N/W IF for determining the degree of an ACK delay and the like.

Figure 4:
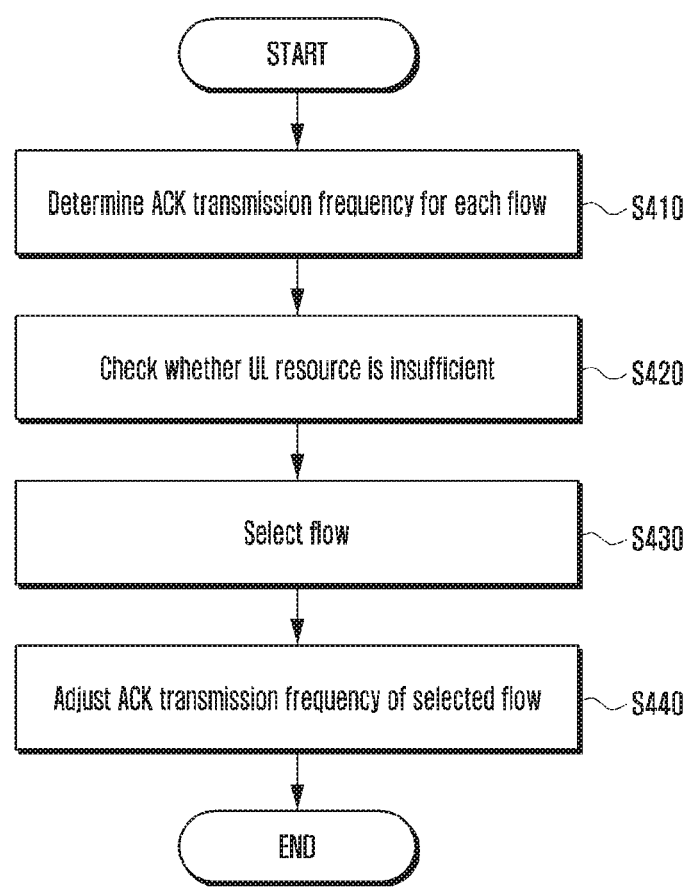
FIG. 4 is a diagram illustrating a method for adjusting a transmission frequency of a transmission control protocol (TCP) acknowledgment (ACK) according to an embodiment of the disclosure.

FIG. 4 is a diagram illustrating a method for adjusting a transmission frequency of a TCP ACK according to an embodiment of the disclosure.

Referring to FIG. 4, at operation S410, a communication apparatus may determine an ACK transmission frequency for each flow. As described above, the communication apparatus may include a terminal, a TCP proxy, a TCP enhancer, or the like.

The communication apparatus may determine the optimal ACK transmission frequency, based on a congestion control algorithm state of a transmitting end (hereinafter, a state of a TCP transmitter). That is, the communication apparatus may determine the optimal TCP ACK compression rate for each flow and apply this to each flow.

In addition, at operation S420, the communication apparatus may check (or identify) whether uplink resources are insufficient. At this time, information about uplink resources may be received from a lower layer (e.g., modem, communication processor (CP), etc.).

The communication apparatus may check whether uplink resources are insufficient, based on the received information about uplink resources. For example, as described above, the information about uplink resources may include at least one of the size of the most recently allocated uplink resource, the average size of recently allocated uplink resources, or the size of an uplink resource predicted to be allocated through the average size of recently allocated uplink resources. If the information about uplink resources is smaller than a threshold value, the communication apparatus may determine that uplink resources are insufficient. In addition, the information about uplink resources may indicate whether current uplink resources are insufficient, or whether predicted uplink resources are insufficient. Based on this information, the communication apparatus may check whether uplink resources are insufficient.

If uplink resources are not insufficient, the communication apparatus does not need to adjust the ACK transmission frequency separately and may transmit ACK according to a previously applied transmission frequency. However, if the state of the TCP transmitter is changed for each flow, the communication apparatus may change the TCP transmission frequency, based on the state of the TCP transmitter.

If uplink resources are insufficient, the communication apparatus may select at operation S430 a flow for which the ACK transmission frequency will be adjusted. The communication apparatus may determine such a flow, based on priorities of flows. Details of this will be described later.

In addition, the communication apparatus may adjust the ACK transmission frequency of the selected flow at operation S440. At this time, the communication apparatus may adjust the ACK transmission frequency of the flow, based on the state of the TCP transmitter. For example, the transmission frequency may be adjusted differently when the TCP transmitter state of the selected flow is in a congestion avoidance state or a fast recovery state.

As described above, by variably adjusting the transmission frequency of ACK, the disclosure may improve the performance of a system without decreasing the throughput.

Figure 5:
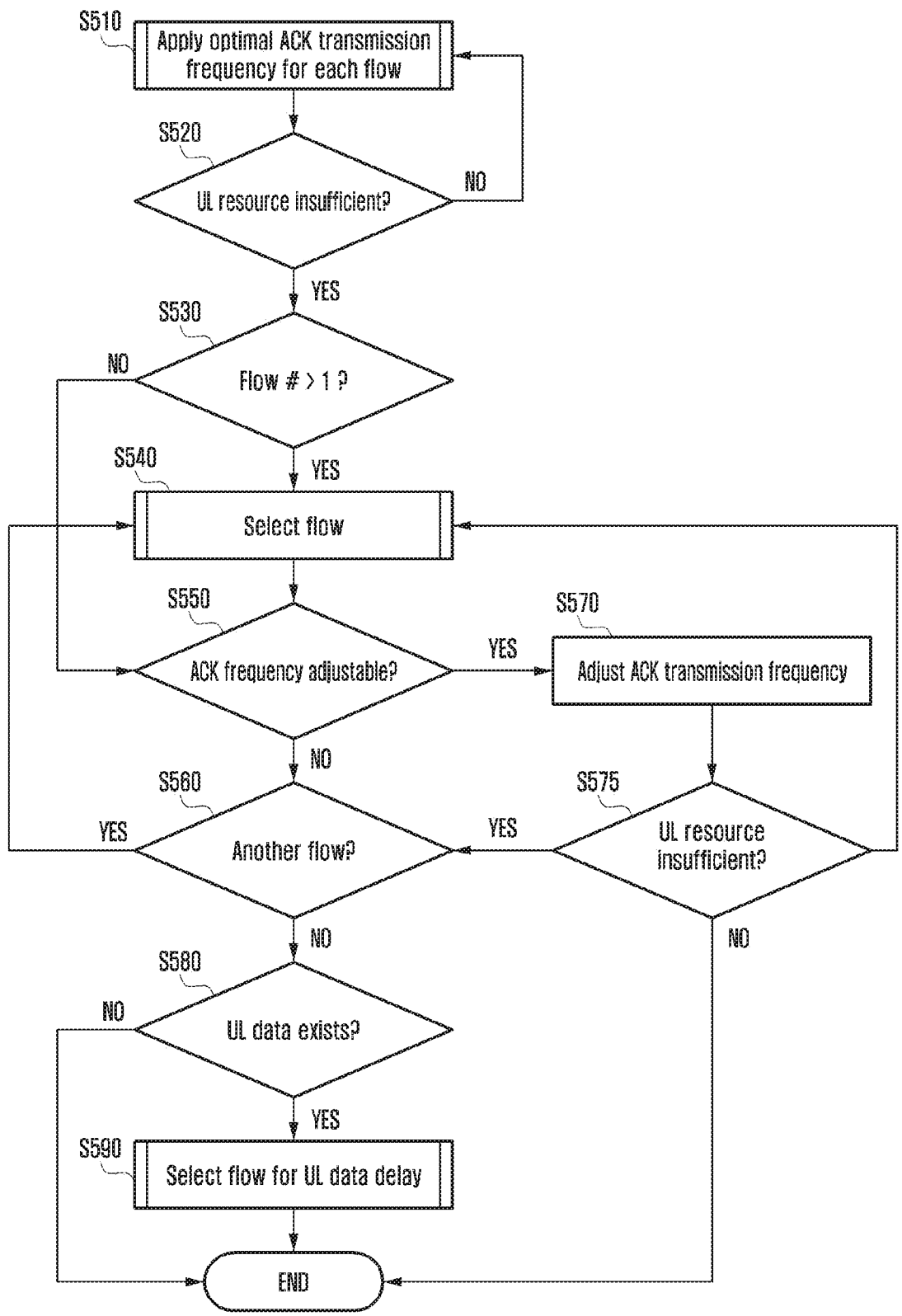
FIG. 5 is a diagram illustrating a method for adjusting a transmission frequency of a TCP ACK according to an embodiment of the disclosure.

FIG. 5 is a diagram illustrating a method for adjusting a transmission frequency of a TCP ACK according to an embodiment of the disclosure.

At operation S510, the communication apparatus may determine the optimal ACK transmission frequency (ACK compression/delay rate) for each flow. Then, the communication apparatus may process TCP ACK by applying the compression/delay rate. At this time, the communication apparatus may utilize the TCP transmitter state to determine the optimal ACK transmission frequency or compression/delay rate for each flow. A detailed procedure will be described later. This operation is a function that can be independently determined and processed by the ACK processor of the TCP layer without information about uplink resources received from the N/W IF.

At operation S520, the communication apparatus may check whether uplink resources are insufficient. The ACK processor may receive information about uplink resources from the N/W IF and thereby check the insufficiency of uplink resources.

For example, as described above, the information about uplink resources may include at least one of the size of the most recently allocated uplink resource, the average size of recently allocated uplink resources, or the size of an uplink resource predicted to be allocated through the average size of recently allocated uplink resources. If the information about uplink resources is smaller than a threshold value, the communication apparatus may determine that uplink resources are insufficient. In addition, the information about uplink resources may indicate whether current uplink resources are insufficient, or whether predicted uplink resources are insufficient. Based on this information, the communication apparatus may check whether uplink resources are insufficient.

If uplink resources are not insufficient, the communication apparatus does not need to adjust the ACK transmission frequency separately and may transmit ACK according to a previously applied transmission frequency. However, if the state of the TCP transmitter is changed for each flow, the communication apparatus may change the TCP transmission frequency, based on the state of the TCP transmitter.

If uplink resources are insufficient, the communication apparatus may adjust the ACK transmission frequency, based on the received information. Specifically, the communication apparatus may further increase the delay rate or compression rate of TCP ACK so that a TCP ACK response is performed according to the insufficient uplink resources.

If there are two or more TCP flows being processed by the apparatus, the TCP ACK delay rate or compression rate may be adjusted for a part of such flows.

Therefore, at operation S530, the communication apparatus may check whether the number of flows exceeds one.

Based on a rule in consideration of various conditions, the communication apparatus may determine the flow for which the transmission frequency will be adjusted (delay or compression will be further performed). This will be described later.

If the number of flows exceeds one, the communication apparatus may select at operation S540 a flow for which the ACK transmission frequency will be adjusted. As described above, the communication apparatus may select the flow, based on priorities of flows.

If it is determined at operation S530 that there is only one TCP flow being processed, or if the TCP flow for which the transmission frequency will be adjusted is selected at operation S540, the communication apparatus may determine at operation S550 whether it is possible to adjust the transmission frequency of TCP ACK for a corresponding flow.

The ACK processor of the communication apparatus may previously store the minimum TCP ACK number required to respond within a unit time, or the maximum compression rate. If the ACK transmission frequency (or compression rate) determined at operation S510 is a value corresponding to the predetermined minimum ACK transmission frequency (or maximum compression rate), it is not possible to adjust the ACK transmission frequency any more for the corresponding flow. This is because, when the ACK transmission frequency is further lowered or the delay or compression is further applied, the performance of the TCP flow may be greatly degraded. Therefore, for the corresponding flow, the communication apparatus does not adjust the ACK transmission frequency any more (i.e., does not apply delay or compression).

Therefore, at operation S560, the communication apparatus may check whether there is another flow.

If there is another flow, the communication apparatus may return to operation S540 and select another flow.

Meanwhile, if the ACK transmission frequency (or compression rate) of the flow is greater than the predetermined maximum ACK transmission frequency (or smaller than the maximum compression rate), the communication apparatus may adjust the ACK transmission frequency of the flow at operation S570 (or increase the compression rate for further delay/compression).

At this time, the communication apparatus may adjust the ACK transmission frequency, based on the TCP transmitter state of the flow. For example, as will be described later, when an increase rate of data reception amount per unit time is smaller than 1 (i.e., a fast recovery state), the ACK transmission frequency may be set equal to the data reception frequency (the compression rate is set to 1). Also, when the increase rate of data reception amount is similar to 1, that is, has a value within a certain error range (i.e., a congestion avoidance state), the communication apparatus may set the ACK transmission frequency to be is smaller than that in the fast recovery state.

Then, at operation S575, the communication apparatus may check whether uplink resources are still insufficient, that is, whether the insufficiency of uplink resources is solved through the adjustment of the TCP transmission frequency (or increase of the compression/delay rate) as described above.

If solved, the process is terminated. If not solved, the process returns to operation S560 to check whether there is another flow.

If there is no flow for the adjustment of ACK transmission frequency (for further delay/compression) even though all flows are completely checked, the communication apparatus may check at operation S580 whether there is TCP data to be transmitted on uplink.

If there is no TCP data to be transmitted on uplink, the process may be terminated. If there is TCP data to be transmitted on uplink, the communication apparatus may select a flow for an uplink data delay at operation S590.

When there are two or more TCP flows, it may be sufficient to delay TCP data for a part of such flows. Therefore, based on a rule in consideration of various conditions, a flow for a delay or compression of uplink data transmission may be determined. Specifically, based on priorities of flows, the communication apparatus may select the flow as described above at operation S540.

Figure 6:
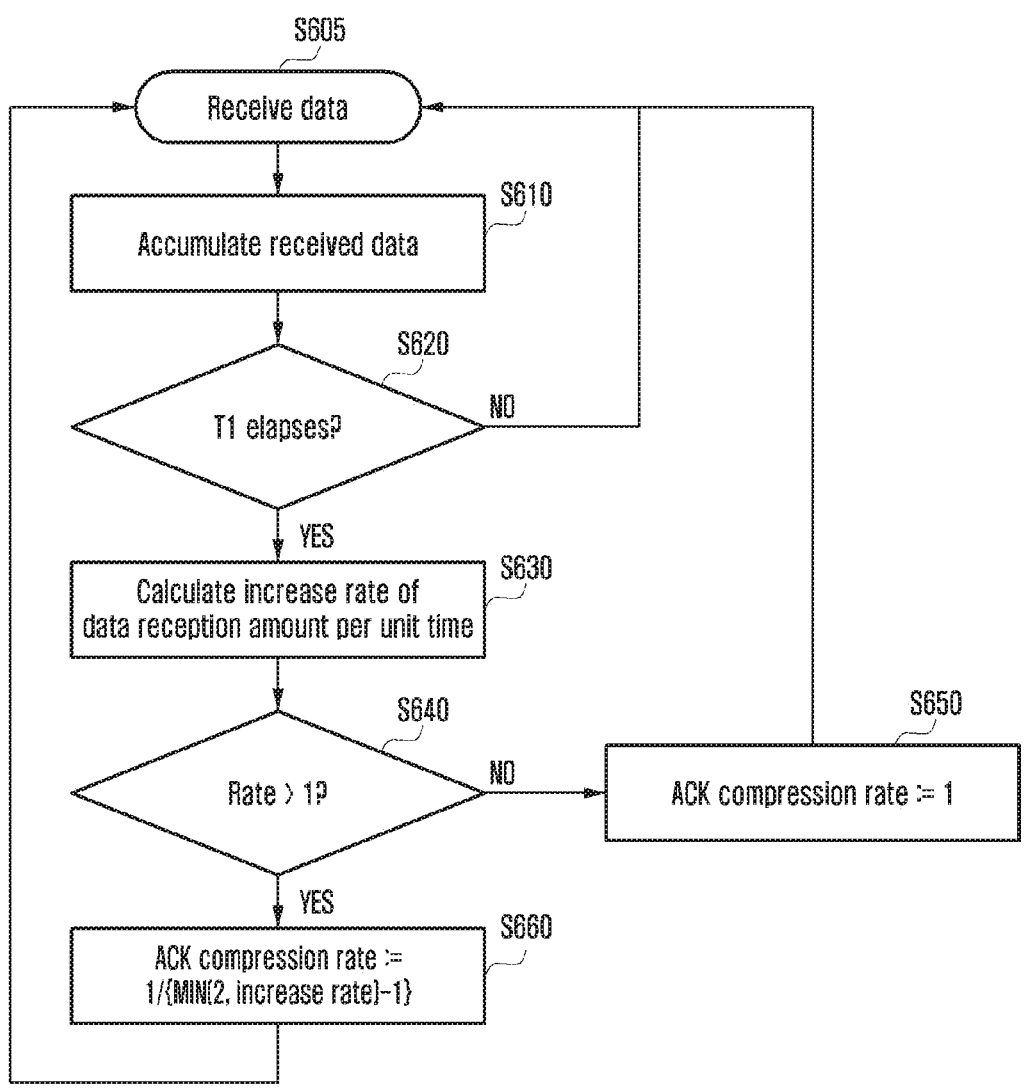
FIG. 6 is a diagram illustrating one method for determining an optimal ACK transmission frequency for each flow according to an embodiment of the disclosure.

FIG. 6 is a diagram illustrating one method for determining an optimal ACK transmission frequency for each flow according to an embodiment of the disclosure.

As described above, the ACK transmission frequency may be determined based on the ACK compression rate or delay rate. Thus, the ACK transmission frequency may be referred to as an ACK compression rate or delay rate. This may be applied to the entirety of the disclosure.

A process of determining the ACK transmission frequency may be performed independently by the ACK processor of the TCP layer without information about uplink resources received from the N/W IF.

First, the communication apparatus may receive data at operation S605. Then, the communication apparatus may accumulate the received data at operation S610. While receiving data for a predetermined unit time T1, the communication apparatus may record a cumulative reception amount. The unit time T1 may be the product of n (a small integer equal to or greater than 1) and a round trip time (RTT). A value of RTT may be the minimum value of measured RTT or the average value of measured RTT.

At operation S620, the communication apparatus may determine whether the unit time T1 elapses.

If the unit time elapses, the communication apparatus may calculate an increase rate of data reception amount per unit time at operation S630. That is, whenever the time of T1 elapses, the communication apparatus may calculate the increase rate of data reception amount per unit time.

The increase rate of data reception amount per unit time may be defined as the data reception amount for the present T1 divided by the data reception amount for the previous T1. If there is no record of the data reception amount for the previous T1 because the initial T1 elapses after the establishment of connection, the data reception amount for the previous T1 is assumed to be zero.

At operation S640, the communication apparatus may check whether the increase rate of data reception amount per unit time is greater than one.

If the increase rate of data reception amount per unit time is not greater than one, the communication apparatus may set the ACK transmission frequency to the maximum at operation S650. That is, the communication apparatus may set the ACK transmission frequency to transmit TCP ACK whenever TCP data is received. Alternatively, the communication apparatus may set the TCP ACK transmission frequency to be equal to the TCP data reception frequency. Alternatively, the communication apparatus may set the compression/delay rate of TCP ACK to one.

That is, when the increase rate of data reception amount per unit time is not greater than one, the state of the TCP transmitter may be a fast retransmission state. That is, for retransmission, the communication apparatus may be configured to transmit TCP ACK whenever data is received.

In case of the above-described structure of FIG. 2, the compression/delay rate of TCP ACK may be defined as how many TCP ACKs inputted to the apparatus are required to send one TCP ACK to the output interface. In case of the above-described structure of FIG. 1 or 3, the compression/delay rate of TCP ACK may be defined as how many received TCP data are required to generate and send one TCP ACK. Also, the TCP ACK may be transmitted in case of ACK timeout regardless of the TCP ACK compression/delay rate as defined above. Therefore, if the compression/delay rate of TCP ACK is determined as one, the TCP ACK is generated and sent immediately upon receipt of TCP data, or the TCP ACK received from the terminal is delivered immediately to the server without compression.

If the increase rate of data reception amount per unit time is greater than one, the communication apparatus may determine the ACK transmission frequency according to a predetermined rule at operation S660.

For example, the communication apparatus may determine the TCP ACK compression/delay rate as "1/{MIN(2, increase rate of data reception amount)−1}" or a value proportional thereto. Then, the communication apparatus may determine the ACK transmission frequency, based on the determined TCP ACK compression/delay rate.

If packet loss does not occur, the TCP connection starts from a slow start state and shifts to a congestion avoidance state when a congestion window (cwnd) of the server exceeds a threshold value (ssthresh). The server which is in the slow start state increases the congestion window (cwnd) by one when receiving TCP ACK. Thus, the increase rate of reception amount per RTT becomes larger close to two (or greater than two if T1 is a multiple of RTT). The server which is in the congestion avoidance state increases the congestion window (cwnd) by one when receiving TCP ACK normally corresponding to the cwnd size. Thus, the increase rate of reception amount per RTT is slightly larger than one. That is, according to the above equation (or condition), the TCP ACK compression/delay rate has a value of 1 in the slow start state, resulting in an immediate response of TCP ACK. However, in the congestion avoidance state, the TCP ACK compression/delay rate becomes higher as the cwnd size increases.

Figure 7A:
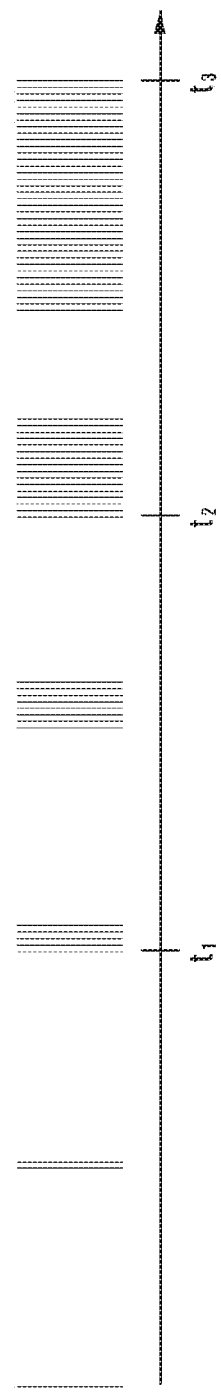
FIGS. 7A, 7B, and 7C are diagrams illustrating an example of reception of a data packet per unit time according to various embodiments of the disclosure.
Figure 7B:
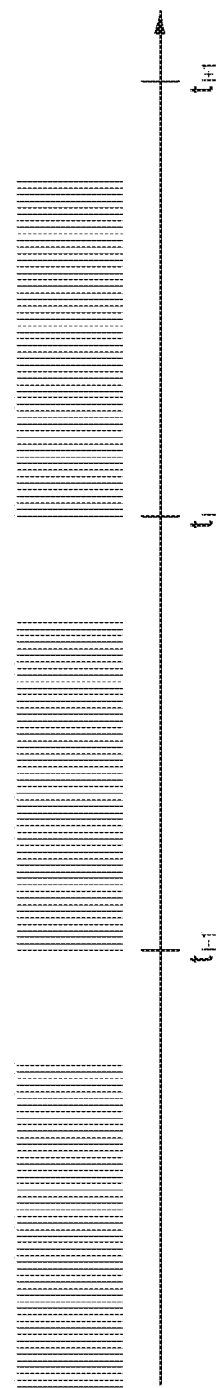
Figure 7C:
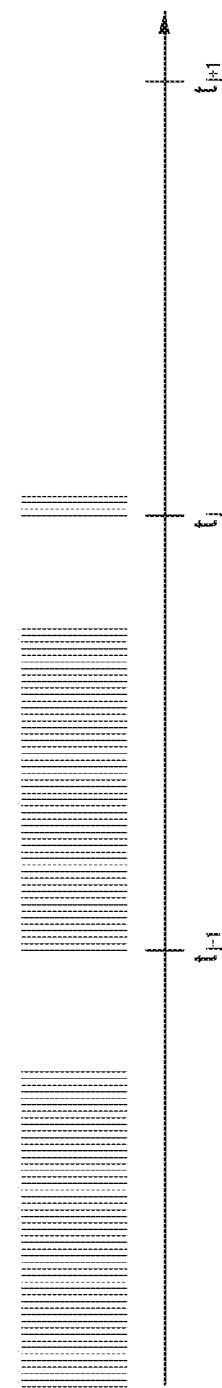

FIGS. 7A, 7B, and 7C are diagrams illustrating an example of reception of a data packet per unit time according to various embodiments of the disclosure.

FIG. 7A shows one example of data reception when the TCP connection is in the slow start state.

Referring to FIG. 7A, the data reception amount at the time $t_1$ is 3, and the data reception amount at the time $t_2$ from the time $t_1$ is 12. Therefore, the increase rate of data reception amount at the time $t_2$ is 4 (=12/3), so that the ACK delay/compression rate is calculated as 1 (=1/{MIN(2, 4)−1}). That is, when the state of the TCP connection is the slow start state, the ACK delay/compression rate is determined as one, and the TCP ACK will be transmitted whenever TCP data is received.

FIG. 7B shows one example of data reception when the TCP connection is in the congestion avoidance state. Referring to FIG. 7B, the data reception amount at the time $t_{i-1}$ is 50, and the data reception amount at the time $t_i$ from the time $t_{i-1}$ is 51. Therefore, the increase rate of data reception amount at the time $t_i$ is 1.02 (=51/50), so that the ACK delay/compression rate is calculated as 50 (=1/{MIN(2, 1.02)−1}). This means that one TCP ACK is transmitted in response to 50 TCP data. That is, when the TCP transmitter is in the congestion avoidance state, the overhead of TCP protocol can be reduced by adjusting the transmission frequency of TCP ACK.

FIG. 7C shows one example of data reception when the congestion window of the server decreases due to an event such as a packet loss. Referring to FIG. 7C, the data reception amount at the time $t_j$ from the time $t_{j-1}$ is 50, and the data reception amount at the time $t_{j-1}$ from the time $t_j$ is 4. Therefore, the increase rate of data reception amount at the time $t_{j-1}$ is 0.08 (=4/50), so that the ACK delay/compression rate is calculated as 1.

That is, if the reception amount of data decreases sharply, this may be a state for retransmission (i.e., a fast recovery state) due to an event such as a packet loss. As the retransmission becomes faster, the fast recovery state may be terminated faster for performance improvement. Therefore, the ACK delay/compression rate is determined as 1 in order to transmit a response of TCP ACK quickly, and the TCP ACK may be transmitted whenever TCP data is transmitted.

Figure 8:
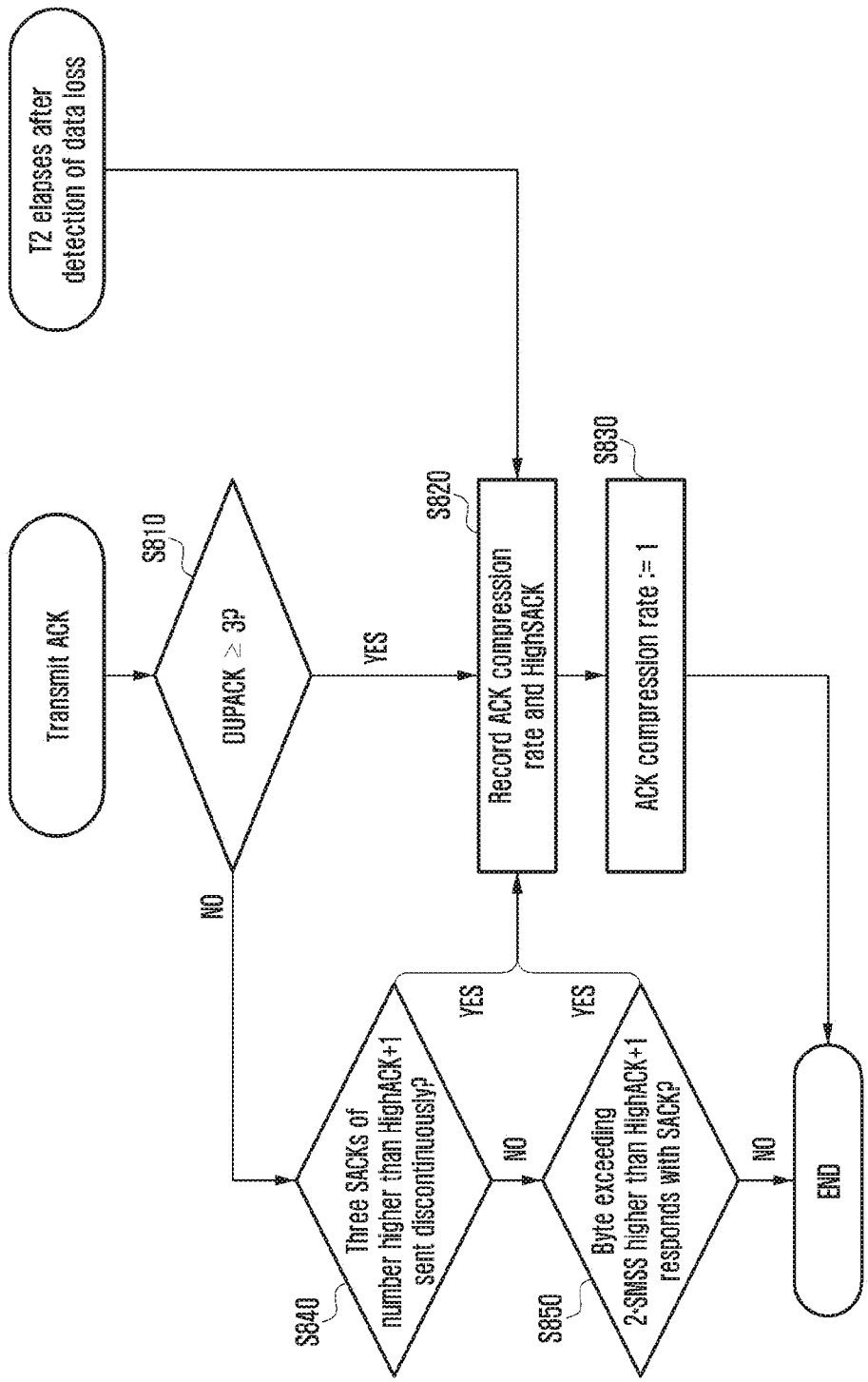
FIG. 8 is a diagram illustrating another method for determining an optimal ACK transmission frequency for each flow according to an embodiment of the disclosure.

FIG. 8 is a diagram illustrating another method for determining an optimal ACK transmission frequency for each flow according to an embodiment of the disclosure.

At operation S810, the communication apparatus determines whether three duplicate ACKs (DUPACKs) (or more than three DUPACKs) are transmitted to the server. If so, the server performs the fast retransmission and the fast recovery after receiving three DUPACKs. Therefore, as a response of TCP ACK is fast, the fast recovery is terminated faster for performance improvement.

When three DUPACKs are transmitted, the communication apparatus may record a current ACK transmission frequency (ACK compression/delay rate) at operation S820. If a TCP selective ACK (SACK) option is used and if the SACK information has responded, the communication apparatus records the highest sequence number (HighSACK) that responded with the SACK.

Then, at operation S830, the communication apparatus may determine the ACK compression rate as one. That is, the communication apparatus may set the ACK transmission frequency so that TCP ACK is transmitted whenever TCP data is received.

However, even if three DUPACKs are not transmitted, the TCP server may enter the fast retransmission/recovery on the basis of the SACK information when predetermined conditions are satisfied.

In this case, the predetermined conditions are as follows.

First, when three SACKs with a number greater than HighACK+1 (HighACK means the highest number of ACK numbers sent so far) are sent discontinuously, the TCP connection may enter the fast retransmission/recovery.

Second, when the SACK with a byte exceeding 2*SMSS with a sequence number higher than HighACK+1 is responded, the TCP connection may enter the fast retransmission/recovery.

Therefore, even if three DUPACKs are not transmitted, the communication apparatus may record the current ACK compression rate when the predetermined condition is satisfied, and then determine the ACK compression rate as 1.

Specifically, at operation S840, the communication apparatus may determine whether three SACKs of a number greater than HighACK+1 are sent discontinuously. If so, the communication apparatus may return to operations S820 and S830 to record the ACK compression rate and then determine the ACK compression rate as 1 as in case of transmitting three DUPACKs.

If three SACKs of a number greater than HighACK+1 are not sent discontinuously, the communication apparatus may determine at operation S850 whether a byte exceeding 2*SMSS higher than HighACK+1 responds with the SACK.

If so, the communication apparatus may return to operations S820 and S830 to record the ACK compression rate and then determine the ACK compression rate as 1 as in case of transmitting three DUPACKs.

The order of performing the above determination operations S840 and S850 may be changed.

Meanwhile, when a predetermined time (T2) elapses after lost data is detected, a retransmission timeout (RTO) may occur at the TCP transmitter. In this case, the predetermined time (T2) means the time of the RTO level, for example, RTT+4mdev.

When a certain time elapses after detection of lost data, the TCP proxy is required to quickly transmit ACK to quickly increase the congestion window. Therefore, the communication apparatus may set the ACK compression rate to 1.

Figure 9:
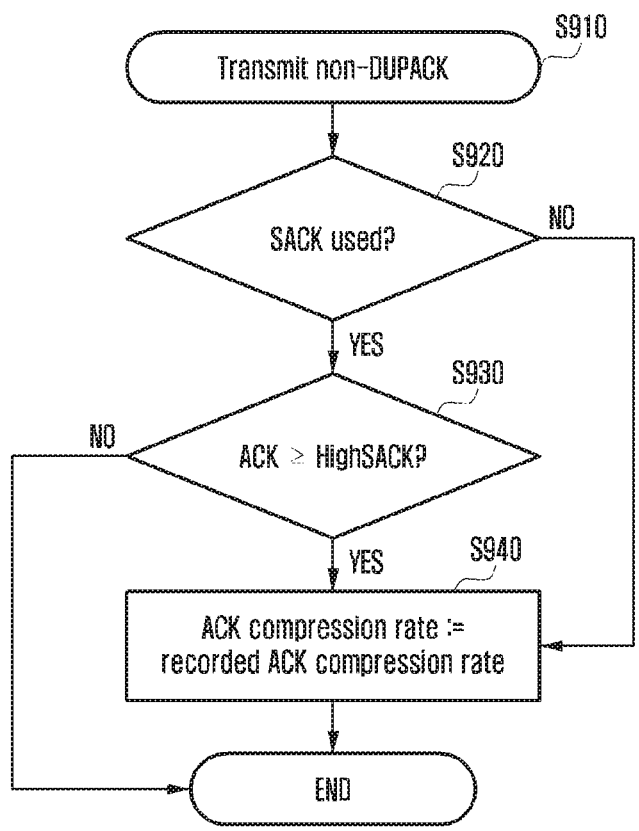
FIG. 9 is a diagram illustrating still another method for determining an optimal ACK transmission frequency for each flow according to an embodiment of the disclosure.

FIG. 9 is a diagram illustrating still another method for determining an optimal ACK transmission frequency for each flow according to an embodiment of the disclosure.

This process is to enable the communication apparatus to increase the compression rate again when the TCP transmitter being in the fast recovery state detects an event of terminating the fast recovery state.

The condition for terminating the fast recovery may include, for example, a case where SACK is not used and ACK is transmitted, or a case where SACK is used and an ACK number is greater than or equal to a recorded HighSACK number. A detailed description is as follows.

This process is applied to cases where the communication apparatus transmits ACK other than DUPACK (i.e., non-DUPACK).

At operation S910, the communication apparatus may transmit ACK (i.e., non-DUPACK). In case of transmitting ACK, the communication apparatus may predict that the fast recovery state of the TCP transmitter will be terminated and the congestion avoidance state will be entered.

Therefore, the communication apparatus may check at operation S920 whether the TCP connection is using the SACK option. If the SACK option is not used, the communication apparatus may predict that the TCP transmitter will terminate the fast recovery immediately after receiving the non-DUPCK.

Therefore, the communication apparatus may determine to restore the ACK compression rate to the previously recorded ACK compression rate. Alternatively, the ACK transmission frequency may be restored to the previously recorded ACK transmission frequency. Alternatively, the ACK compression rate may be determined as a constant multiple (e.g., 0.7) of the previously recorded ACK compression rate. In this case, the communication apparatus may perform an operation of checking whether the current compression rate is 1. If the compression rate is 1, the ACK compression rate may be restored to the previously recorded ACK compression rate.

If the SACK option is used, the communication apparatus may check at operation S930 whether the ACK number of the non-DUPACK is greater than or equal to the highest sequence number (HighSACK) which responded with SACK.

If the ACK number of the non-DUPACK is greater than or equal to the HighSACK, the communication apparatus may determine to restore the ACK compression rate to the previously recorded ACK compression rate at operation S940. Alternatively, the ACK compression rate may be determined as a constant multiple (e.g., 0.7) of the previously recorded ACK compression rate.

Figure 10:
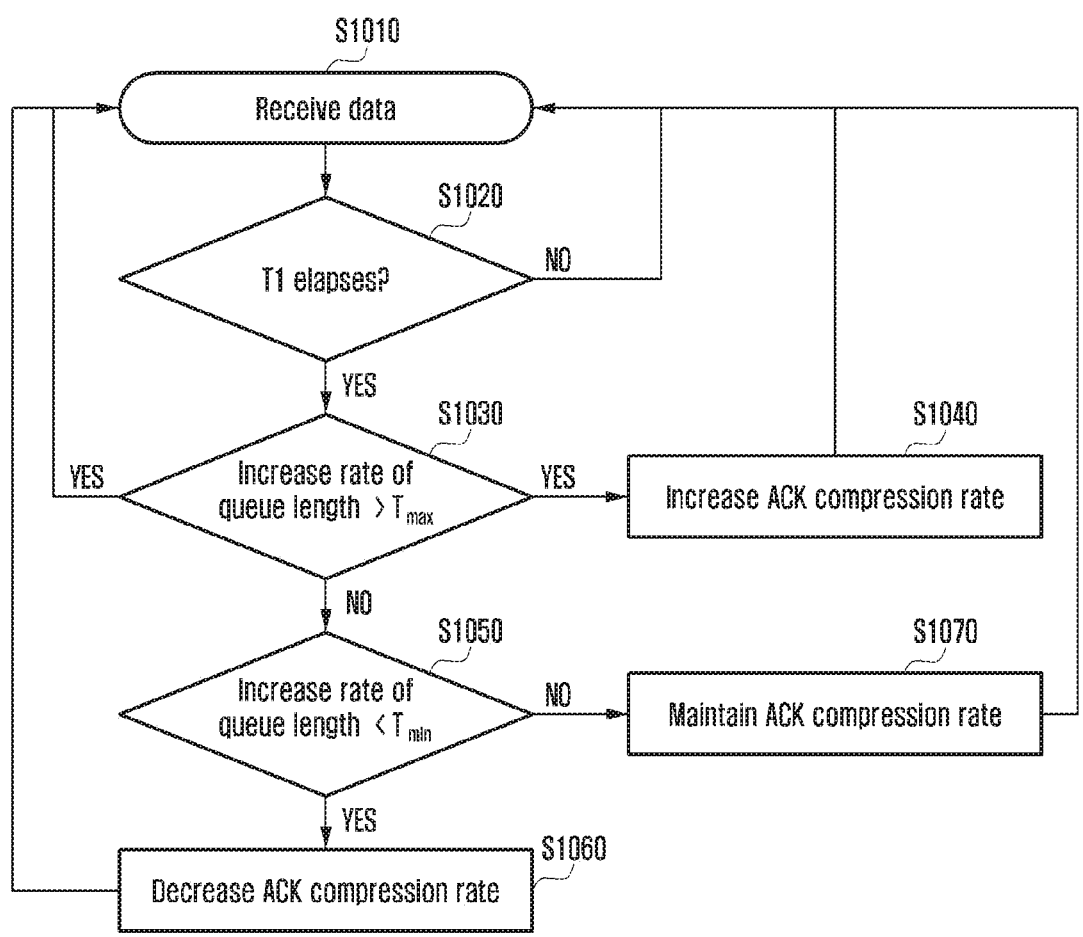
FIG. 10 is a diagram illustrating yet another method for determining an optimal ACK transmission frequency for each flow according to an embodiment of the disclosure.

FIG. 10 is a diagram illustrating yet another method for determining an optimal ACK transmission frequency for each flow according to an embodiment of the disclosure. This method may be used only in the structure shown in FIG. 3.

In this embodiment, the TCP connection between the terminal and the server is divided into two TCP connections, i.e., a terminal-proxy TCP connection and a proxy-server TCP connection. If the terminal-proxy connection has small bandwidth, and if the proxy-server connection has great bandwidth and thus more and more data are accumulated in a proxy queue, the proxy will not need to receive more data from the server sooner and can delay much more TCP ACKs.

Therefore, the communication apparatus may receive data at operation S1010. Then, at operation S1020, the communication apparatus may check whether a unit time T1 elapses.

When the unit time T1 elapses, the communication apparatus may calculate an increase rate of queue length of the proxy at every unit time T1.

Then, at operation S1030, the communication apparatus may determine whether the increase rate of queue length is greater than the maximum threshold value $T_{max}$.

If so, the communication apparatus may increase the ACK compression rate at operation S1040. At this time, the communication apparatus may increase the ACK compression rate according to a predetermined rule, for example, an increase of 10% from a current value.

If the increase rate is not greater than the maximum threshold value $T_{max}$, the communication apparatus may determine at operation S1050 whether the increase rate of queue length is smaller than the minimum threshold value $T_{min}$.

If so, the communication apparatus may decrease the ACK compression rate at operation S1060. At this time, the communication apparatus may reduce the ACK compression rate according to a predetermined rule, for example, a decrease of 20% from a current value.

If the increase rate of queue length is not smaller than the minimum threshold value $T_{min}$, the communication apparatus may maintain the ACK compression rate at operation S1070.

Although the increase rate is used for description in this embodiment, any other parameter associated with the queue length, such as the absolute value of the queue length, may be used alternatively.

Figure 11:
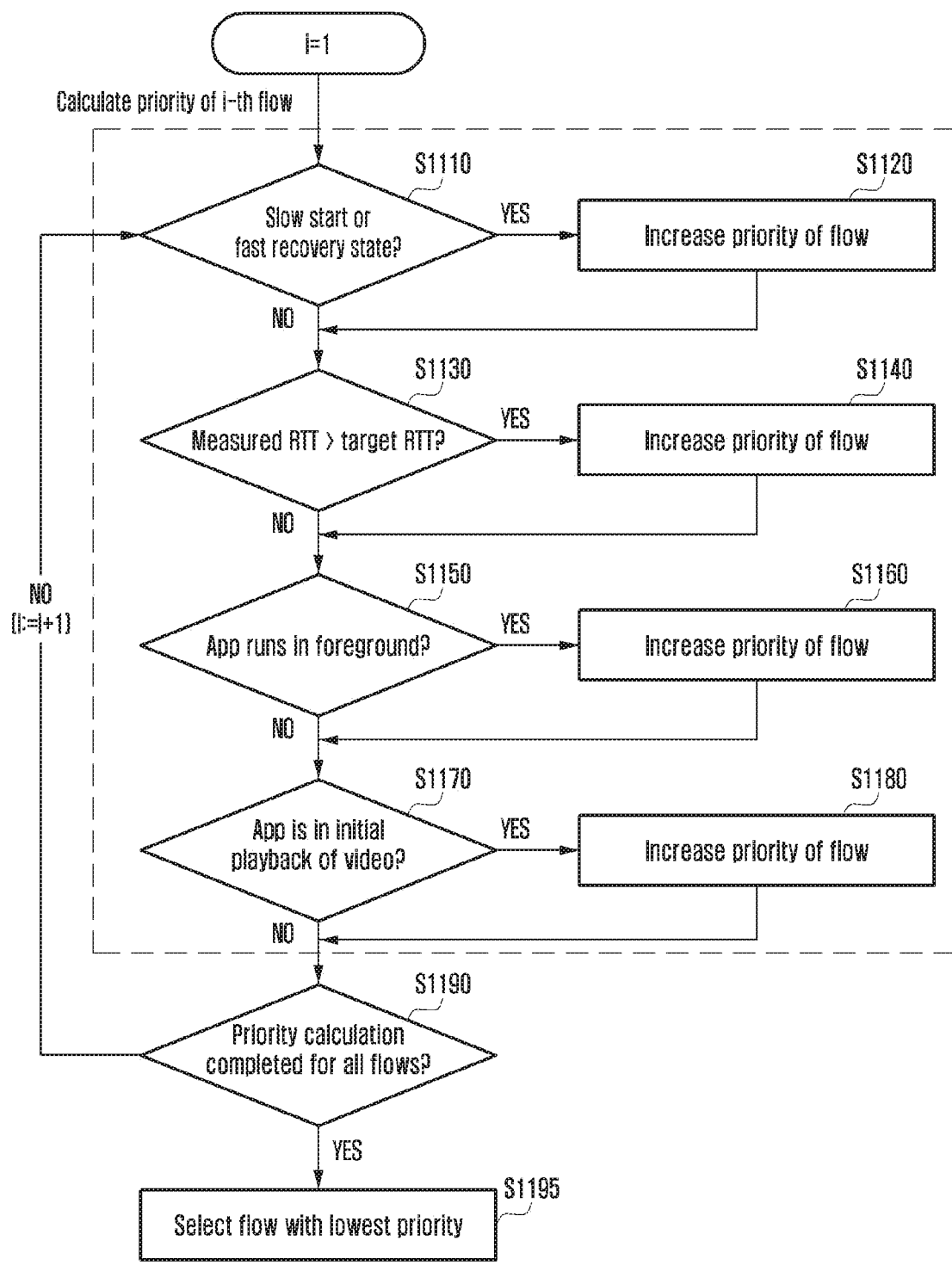
FIG. 11 is a diagram illustrating a method for determining a flow when there are two or more TCP flows according to an embodiment of the disclosure.

FIG. 11 is a diagram illustrating a method for determining a flow when there are two or more TCP flows according to an embodiment of the disclosure.

The TCP ACK delay rate or compression rate may be increased for part of two or more flows. Therefore, when priorities are given in consideration of various conditions, a flow having the lowest priority may be selected for adjustment of the ACK transmission frequency.

In this embodiment, the communication apparatus may check whether each of flows being processed satisfies one of predetermined conditions. If there is a satisfying flow, the communication apparatus may increase the priority of the flow. Increasing the priority may be adding or multiplying an initial priority value to or by a certain value. The conditions that allow an increase of priority are as follows.

At operation S1110, the communication apparatus may check whether the TCP transmitter is in the slow start or fast recovery state. If it is estimated that the TCP transmitter is in the slow start or fast recovery state, the communication apparatus may increase the priority of the flow at operation S1120. The method of checking whether the TCP transmitter is in the slow start or fast recovery state is as described earlier in FIGS. 6 to 9.

In addition, at operation S1130, the communication apparatus may check whether a measured RTT is greater than a target RTT. If so, the communication apparatus may increase the priority of the flow at operation S1140.

In addition, at operation S1150, the communication apparatus may check whether an application being transmitted or received using the flow runs in the foreground. If so, the communication apparatus may increase the priority of the flow at operation S1160.

In addition, at operation S1170, the communication apparatus may check whether the application being transmitted or received using the flow is a video application and whether the application is in the initial playback state of video. If so, the communication apparatus may increase the priority of the flow at operation S1180.

In addition, at operation S1190, the communication apparatus may check whether the priority calculation is completed for all the flows.

After checking whether each flow satisfies the above conditions and also updating the priority of a corresponding flow, the communication apparatus may select the flow having the lowest priority at operation S1195.

Figure 12:
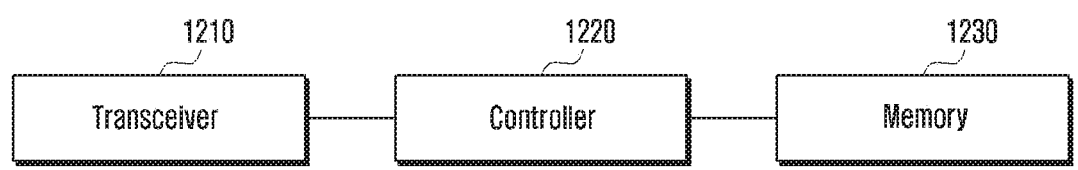
FIG. 12 is a diagram illustrating a structure of a communication apparatus according to an embodiment of the disclosure.

FIG. 12 is a diagram illustrating a structure of a communication apparatus according to an embodiment of the disclosure.

As described above, the communication apparatus may include a terminal, a proxy apparatus, a proxy enhancer, and the like.

As shown in FIG. 12, the communication apparatus may include a transceiver 1210, a controller 1220 (e.g., at least one processor), and a storage 1230 (e.g., memory). In the disclosure, the controller may be defined as a circuit, an application-specific integrated circuit or at least one processor.

The transceiver 1210 may transmit and receive signals with other network entities. For example, the transceiver 1210 may receive data from the server and transmit ACK, generated by the communication apparatus or received from the terminal, to the server.

The controller 1220 may control the overall operations of the communication apparatus according to various embodiments of the disclosure. For example, the controller 1220 may control a signal flow between respective blocks to perform the above-described operations.

Specifically, the controller 1220 may determine the ACK transmission frequency for each flow. That is, the controller 1220 may determine the optimum ACK transmission frequency, based on the state of the TCP transmitter. For example, the controller 1220 may determine the optimal TCP ACK compression rate for each flow and apply it to each flow.

In addition, the controller 1220 may check whether uplink resources are insufficient. At this time, information about uplink resources may be received from a lower layer (e.g., modem, CP, etc.).

The controller 1220 may determine whether uplink resources are insufficient, based on the received information about uplink resources. If uplink resources are not insufficient, the controller 1220 does not need to adjust the ACK transmission frequency separately and may transmit ACK according to a previously applied transmission frequency. However, if the state of the TCP transmitter is changed for each flow, the controller 1220 may change the TCP transmission frequency, based on the state of the TCP transmitter.

If uplink resources are insufficient, the controller 1220 may select a flow for which the ACK transmission frequency will be adjusted. At this time, the controller 1220 may determine such a flow, based on priorities of flows. Details of this are as described above.

In addition, the controller 1220 may adjust the ACK transmission frequency of the selected flow. At this time, the controller 1220 may adjust the ACK transmission frequency of the flow, based on the state of the TCP transmitter. For example, the transmission frequency may be adjusted differently when the TCP transmitter state of the selected flow is in a congestion avoidance state or a fast recovery state.

As described above, by variably adjusting the transmission frequency of ACK, the disclosure may improve the performance of a system without decreasing the throughput.

In addition, the controller 1220 may control the overall operation of the proxy apparatus proposed by the disclosure, and the details thereof are as described above.

The storage 1230 may store at least one of information transmitted/received through the transceiver 1210 and information generated through the controller 1220. For example, the storage 1230 may store information about uplink resources. In addition, the storage 1230 may store a current compression rate, the number of HighSACK, and the like.

Meanwhile, in the drawings illustrating a method in various embodiments, the order of description does not necessarily correspond to the order of execution, and the order relationship may be changed or executed in parallel.

Alternatively, the drawings illustrating the method of the disclosure may omit some of the elements and may include only some of the elements without impairing the essence of the disclosure.

Further, the method of the disclosure may be carried out in combination with some or all of the contents included in each embodiment without departing from the essence of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a communication apparatus, the method comprising:
   determining an acknowledgement (ACK) transmission ratio for each flow, based on a state of a transmission control protocol (TCP) transmitter;
   identifying whether an amount of allocated uplink resources is less than an amount of uplink resources to be used to transmit a data packet;
   selecting a flow for adjustment of the ACK transmission ratio in case that the amount of the allocated uplink resources is less than the amount of uplink resources to be used to transmit the data packet; and
   adjusting the ACK transmission ratio of the flow,
   wherein the ACK transmission ratio is configured to be equal to a data reception ratio in case that an increase rate of data reception amount is smaller than 1 or equal to 1, and
   wherein the ACK transmission ratio is determined based on a predetermined rule in case that the increase rate of data reception amount is greater than 1.

2. The method of claim 1, wherein the determining of the ACK transmission ratio for each flow comprises:
   identifying the increase rate of data reception amount for unit time.

3. The method of claim 1,
   wherein the determining of the ACK transmission ratio for each flow comprises determining the ACK transmission ratio to be equal to the data reception ratio in case that conditions for performing fast retransmission are satisfied, and
   wherein the conditions for the performing of the fast retransmission are satisfied in case that three or more duplicate ACKs (DUPACKs) occur, three selective ACKs (SACKs) with a number greater than a highest ACK number (HighACK) plus 1 are sent discontinuously, or the SACK with a byte exceeding 2*SMSS with a sequence number higher than the HighACK+1 is responded.

4. The method of claim 3,
   wherein the determining of the ACK transmission ratio for each flow comprises determining the ACK transmission ratio by using a recorded ACK transmission when ratio in case that conditions for terminating the fast retransmission are satisfied, and
   wherein the conditions for the terminating of the fast retransmission are satisfied in case that the SACK is not used and the ACK is transmitted, or the SACK is used and a sequence number of the ACK is greater than or equal to a sequence number of a recorded HighSACK.

5. The method of claim 1,
   wherein the selecting of the flow comprises selecting the flow for adjustment of the ACK transmission ratio based on priorities of flows, and
   wherein the priorities of the flows are determined based on at least one of the state of the TCP transmitter, a measured round trip time (RTT), an application being in an initial playback state of video, or an application running in foreground.

6. The method of claim 1, wherein the communication apparatus includes a terminal or a proxy apparatus 7. The method of claim 1,
   wherein the adjusting of the ACK transmission ratio includes adjusting the ACK transmission ratio based on the state of the TCP transmitter.

8. A communication apparatus comprising:
   a transceiver; and
   at least one processor coupled with the transceiver and configured to:
      determine an acknowledgement (ACK) transmission ratio for each flow, based on a state of a transmission control protocol (TCP) transmitter,
      identify whether an amount of allocated uplink resources is less than an amount of uplink resources to be used to transmit a data packet,
      select a flow for adjustment of the ACK transmission ratio in case that the amount of the allocated uplink resources is less than the amount of uplink resources to be used to transmit the data packet, and
      adjust the ACK transmission ratio of the flow,
   wherein the ACK transmission ratio is configured to be equal to a data reception ratio in case that an increase rate of data reception amount is smaller than 1 or equal to 1, and
   wherein the ACK transmission ratio is determined based on a predetermined rule in case that the increase rate of data reception amount is greater than 1.

9. The apparatus of claim 8, wherein the at least one processor is further configured to:
   identify the increase rate of data reception amount for unit time.

10. The apparatus of claim 8,
    wherein the at least one processor is further configured to determine the ACK transmission ratio to be equal to a data reception ratio in case that conditions for performing fast retransmission are satisfied, and
    wherein the conditions for the performing of the fast retransmission are satisfied in case that three or more duplicate ACKs (DUPACKs) occur, three selective ACKs (SACKs) with a number greater than a highest ACK number (HighACK) plus 1 are sent discontinuously, or the SACK with a byte exceeding 2*SMSS with a sequence number higher than the HighACK+1 is responded.

11. The apparatus of claim 10,
    wherein the at least one processor is further configured to determine the ACK transmission ratio by using a recorded ACK transmission ratio in case that conditions for terminating the fast retransmission are satisfied, and
    wherein the conditions for the terminating of the fast retransmission are satisfied in case that the SACK is not used and the ACK is transmitted, or case where the SACK is used and a sequence number of the ACK is greater than or equal to a sequence number of a recorded HighSACK.

12. The apparatus of claim 8,
    wherein the at least one processor is further configured to select the flow for adjustment of the ACK transmission ratio based on priorities of flows, and
    wherein the priorities of the flows are determined based on at least one of the state of the TCP transmitter, a measured round trip time (RTT), whether an application being in an initial playback state of video, or an application running in foreground.

13. The apparatus of claim 8, wherein the communication apparatus includes a terminal or a proxy apparatus.

14. The apparatus of claim 8, wherein the at least one processor is further configured to:
    adjust the ACK transmission ratio based on the state of the TCP transmitter.

\* \* \* \* \*